USOO5754459A

United States Patent [19]
Telikepalli

[11] Patent Number: 5,754,459
[45] Date of Patent: May 19, 1998

[54] MULTIPLIER CIRCUIT DESIGN FOR A PROGRAMMABLE LOGIC DEVICE

[75] Inventor: Anil L. N. Telikepalli, Lexington, Ky.

[73] Assignee: Xilinx, Inc., San Jose, Calif.

[21] Appl. No.: 598,750

[22] Filed: Feb. 8, 1996

[51] Int. Cl.[6] ............................................. G06F 7/52
[52] U.S. Cl. .............................. 364/759; 364/760.02
[58] Field of Search ................................ 364/760, 754, 364/757, 759, 760.01, 760.02

[56] References Cited

U.S. PATENT DOCUMENTS

| | | | |
|---|---|---|---|
| 4,646,257 | 2/1987 | Essig et al. | 364/760 |
| 5,251,167 | 10/1993 | Simmonds et al. | 364/760 |
| 5,265,043 | 11/1993 | Naini et al. | 364/757 |
| 5,465,226 | 11/1995 | Goto | 364/757 |
| 5,473,559 | 12/1995 | Makino | 364/758 |
| 5,504,915 | 4/1996 | Rarick | 395/800 |

OTHER PUBLICATIONS

"The Programmable Logic Data Book" 1994 edition, pp.2–5 to 2–25, available from Xilinx, Inc., 2100 Logic Drive, San Jose, California.

The Abstract of Suthikshn Kumar, Kevin Forward and M. Palaniswami, "A Fast-Multiplier Generator for FPGAs", pp. 53–56, IEEE 8th International Conference on VLSI Design, Jan. 1995.

"XACT Step, Libraries Guide", 1995 edition, pp. 4–97 to 4–122, available from Xilinx, Inc., 2100 Logic Drive, San Jose, California.

Jalil Gadavi–Ardekani, MxN Booth Encoded Multiplier Generator Using Optimized Wallace Trees, IEEE Transactions on VLSI Systems, pp. 120–125, Apr. 1993.

*Primary Examiner*—Reba I. Elmore
*Assistant Examiner*—Robert J. Dolan
*Attorney, Agent, or Firm*—Kent R. Richardson; Gary A. Hecker; Jeanette S. Harms

[57] ABSTRACT

The multiplier circuit has as input signals an M bit multiplicand and an N bit multiplier and outputs a M+N bit product. The multiplier circuit includes a number of recoder circuits. The recoder circuits recode the N bit multiplier into fewer bits, thereby reducing the longest signal path through the multiplier circuit and increasing the speed of the circuit. In one embodiment, the recoder circuits perform a N to N/2 Booth recoding. The recoder circuits are combined with other circuitry to generate partial products. The partial products are combined in a three to two compression circuit. The compression circuit further reduces the longest signal path through the multiplier circuit. In one embodiment, the three to two compression circuits are configured in a Wallace Tree. In another embodiment, four to two compression circuits are used. The compression circuit outputs two addends. The two addends are then added in an adder to generate the product. The recoder circuit and the first partial product circuits are configured within a single programmable logic element of the programmable logic device. Therefore, one embodiment of the invention efficiently uses the programmable logic elements of the programmable logic device.

30 Claims, 5 Drawing Sheets

MULTIPLIER CIRCUIT DESIGN FOR A PROGRAMMABLE LOGIC DEVICE

BACKGROUND OF THE INVENTION

1. Field of the Invention

This invention relates to the field of binary multiplier. In particular, the invention relates to a multiplier circuit design for use in a programmable logic device.

2. Description of the Related Art

Many different types of multiplier circuit designs presently exist. To multiply an M bit multiplicand by an N bit multiplier, the basic multiplier circuit adds multiplier N to itself (M−1) times. However, the basic multiplier circuit is considerably slower than other designs.

A faster multiplier circuit uses a technique called Booth 2-bit Recoding. In Booth 2-bit Recoding, the multiplier's bits are fed in groups of three bits to several Booth circuits. Each Booth circuit generates several control signals for each group. Table 1 illustrates the control signals Z, X1 and X2. MRp is bit P of the multiplier (MR). MDp is bit P of the multiplicand. The action, defined by the Z, X1 and X2 control signals, indicates the number of times the multiplicand (MD) should be added or subtracted. The Z control signal indicates whether the multiplicand is to be added/subtracted once or twice. The X1 control signal indicates whether the multiplicand is to be added or subtracted. Note that X1 equals MRi+1 The X2 control signal indicates whether any action need be taken at all. For example, where the three bits in the group are 101, the action taken will be to subtract the multiplicand once.

TABLE 1

| MRi + 1 | MRi | MRi − 1 | Action | Z | X1 | X2 |
|---|---|---|---|---|---|---|
| 0 | 0 | 0 | — | 0 | 0 | 0 |
| 0 | 0 | 1 | +MD | 1 | 0 | 1 |
| 0 | 1 | 0 | +MD | 1 | 0 | 1 |
| 0 | 1 | 1 | +2MD | 0 | 0 | 1 |
| 1 | 0 | 0 | −2MD | 0 | 1 | 1 |
| 1 | 0 | 1 | −MD | 1 | 1 | 1 |
| 1 | 1 | 0 | −MD | 1 | 1 | 1 |
| 1 | 1 | 1 | — | 0 | 1 | 0 |

Another technique for realizing a multiplier circuit is to use a Wallace Tree summation. In a Wallace Tree, bits having the same bit weights in the partial products obtained from the multiplier and the multiplicand are added. For example, for an 8×8 multiplier circuit, all the bits of the same bit weight are added, three bits at a time in a full adder. The sum and carry generated from each full adder are added in a carry-save circuit. The final sum and carry are then added in a carry propagate adder to generate the product.

The shift and add multiplier design has been used to implement a multiplier circuit in a programmable logic device, such as a field programmable gate array (FPGA). One such FPGA is the XC4000™ FPGA, available from Xilinx, Inc. of San Jose, Calif. The XC4000 FPGA is described in pages 2–5 to 2–25 of "The Programmable Logic Data Book," 1994 edition, available from Xilinx, Inc. of San Jose, Calif. A programmable logic device includes many programmable logic elements. For example, the XC4000 FPGA includes many configurable logic blocks (CLBs). Each programmable logic element can implement a programmed logic function on a given number of inputs. For example, the XC4000 FPGA can perform two 4-1 logic operations and one 3-1 logic operation within one programmable logic element. Previous multiplier circuit designs have not performed as well as hoped because the designs must be broken down and put in the programmable logic elements. The reason for this is the previous designs have not been fully optimized to take advantage of the programmable logic device's architecture. In particular, the designs have not been optimized to use the programmable logic elements efficiently.

The Abstract of Suthikshn Kumar, Kevin Forward and M. Palaniswami, "A Fast-Multiplier Generator for FPGAs," IEEE 8th International Conference on VLSI Design, January 1995, states that the paper describes a Booth Encoded optimized Wallace tree multiplier circuit architecture. However, this architecture apparently results in undesirably slow calculations. Therefore, it is desirable to implement a multiplier circuit that is faster than any earlier multiplier circuits.

SUMMARY OF THE INVENTION

In accordance with the present invention, a multiplier circuit for a programmable logic device has as inputs an M bit multiplicand and an N bit multiplier and outputs an M+N bit product. The multiplier circuit includes several recoder circuits. The recoder circuits recode the N bit multiplier into fewer bits, thereby reducing the longest signal path through the multiplier circuit and increasing the speed of the circuit. In one embodiment, the recoder circuits perform a N to N/2 Booth recoding. The recoder circuits are combined with other circuitry to generate partial products.

The partial products are combined in a three to two compression circuit. The compression circuit further reduces the longest signal path through the multiplier circuit. In one embodiment, the three to two compression circuits are configured in a Wallace Tree. In another embodiment, five to three compression circuits are used. The compression circuit outputs two addends.

The two addends are then added in an adder to generate the product.

Importantly, the recoder circuit and the first partial product circuits are configured within a single programmable logic element of the programmable logic device. Therefore, one embodiment of the invention efficiently uses the programmable logic elements of the programmable logic device. Further, because the longest signal path is reduced by the recoder circuits and the compression circuit, the multiplier circuit performs faster than previous multiplier circuit designs configured in programmable logic devices.

In one embodiment, a field programmable logic device implements the multiplier circuit as follows. A first set of configurable logic elements implement a Booth recoder circuit that produces partial products. Three of the partial products are added in a second set of configurable logic elements. The second set of configurable logic elements are the top level of a Wallace tree. The results of the added partial products are added in a third set of configurable logic elements to generate carries. The carries, the results of the added partial products, and the fourth partial product are added in a fourth set of configurable logic elements. This fourth set of configurable logic elements generate a carry and a sum. Importantly, the longest signal path through the Booth recoder and Wallace tree includes only the delay of four configurable logic elements. The carry and sum are added in a carry propagate adder to form the product.

In one embodiment, the least significant bits of the sum and carry are generated earlier than the more significant bits of the sum and carry, thereby allowing the carry propagate adder to generate the carries for the least significant bits before the more significant bits arrive at the carry propagate adder. This early generation method reduces the amount of time needed for a carry to propagate through the carry propagate adder.

In one embodiment, the multiplier circuit is implemented in a field programmable gate array. The Booth recoding circuits are implemented in a first set of configurable logic elements. The delay through the first set of configurable logic blocks is the delay of one configurable logic element. The partial products from the first set of configurable logic elements are fed to a second set of configurable logic elements that implement a Wallace tree. The delay through the second set of configurable logic elements is the delay through three configurable logic elements. The results from the second set of configurable logic elements are a sum and a carry. The sum and carry are fed to a carry propagate adder, implemented by another set of configurable logic elements, to produce the product. Importantly, the longest path through the Booth recoder circuits and the Wallace tree is proportional to the delay of four configurable logic elements.

Although many details have been included in the description and the figures, the invention is solely defined by the scope of the claims.

BRIEF DESCRIPTION OF THE DRAWINGS

The figures illustrate the invention by way of example, and not limitation. Like references indicate similar elements.

DETAILED DESCRIPTION OF THE DRAWINGS

Multiplier Circuit

Figure 1:
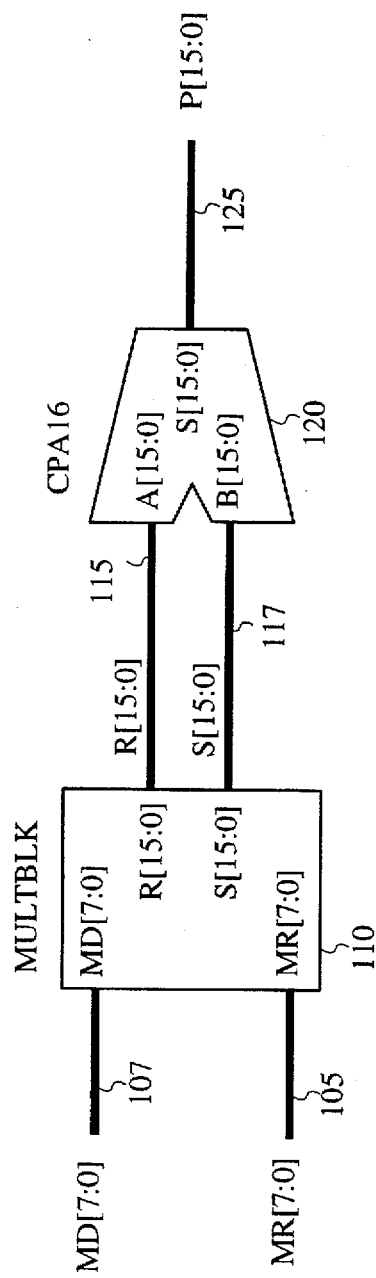
FIG. 1 illustrates a high level view of a multiplier circuit design used in a programmable logic device.

FIG. 1 illustrates an example multiplier circuit design for use in a programmable logic device. In this example, the multiplier circuit multiplies two eight bit numbers (in another embodiment, two sixteen bit numbers are multiplied).

In another embodiment, an M bit number is multiplied by an N bit number, where N and M are four or greater. The multiplier circuit design can perform 2's complement multiplication of positive or negative operands, integers or fractions. The fractions are in the range $[-1 \leq X \leq 1-2^{-(N-1)}]$. Also, the multiplier and the multiplicand can be interchanged.

In one embodiment, the multiplier circuit design is implemented in a programmable logic device. In another embodiment, the multiplier circuit design is implemented in an FPGA. In another embodiment, the multiplier circuit design is implemented in an XC4000E™ FPGA from Xilinx, Inc. of San Jose, Calif.

The multiplier circuit design of FIG. 1 includes a sum and carry generation block (MULTBLK 110) and an adder circuit 120. The MULTBLK 110 has two input signals MR 105 and MD 107 and produces two sixteen bit signals R 115 and S 117. Signal MR 105 includes the bits representing the multiplier and signal MD 107 includes the bits representing the multiplicand. Signal S 117 represents a sum while signal R 117 represents the carries. Adder circuit 120 adds signals R 115 and S 117 to produce the product P 125 of the multiplication of signals MR 105 and MD 107. In one embodiment, the adder circuit 120 includes a sixteen bit carry propagate adder (a ripple adder). In one embodiment using a programmable logic device with fast carry logic, such as in an XC4000 FPGA, signals R 115 and S 117 are fed to the adder circuit 120. The adder circuit then uses the fast carry logic in the FPGA to improve the performance of the multiplier circuit. Additional information regarding carry logic in Xilinx FPGAs is provided in the 1995 Xilinx Libraries Guide, pages 4–97 to 4–122, which is incorporated herein by reference.

Figure 2:
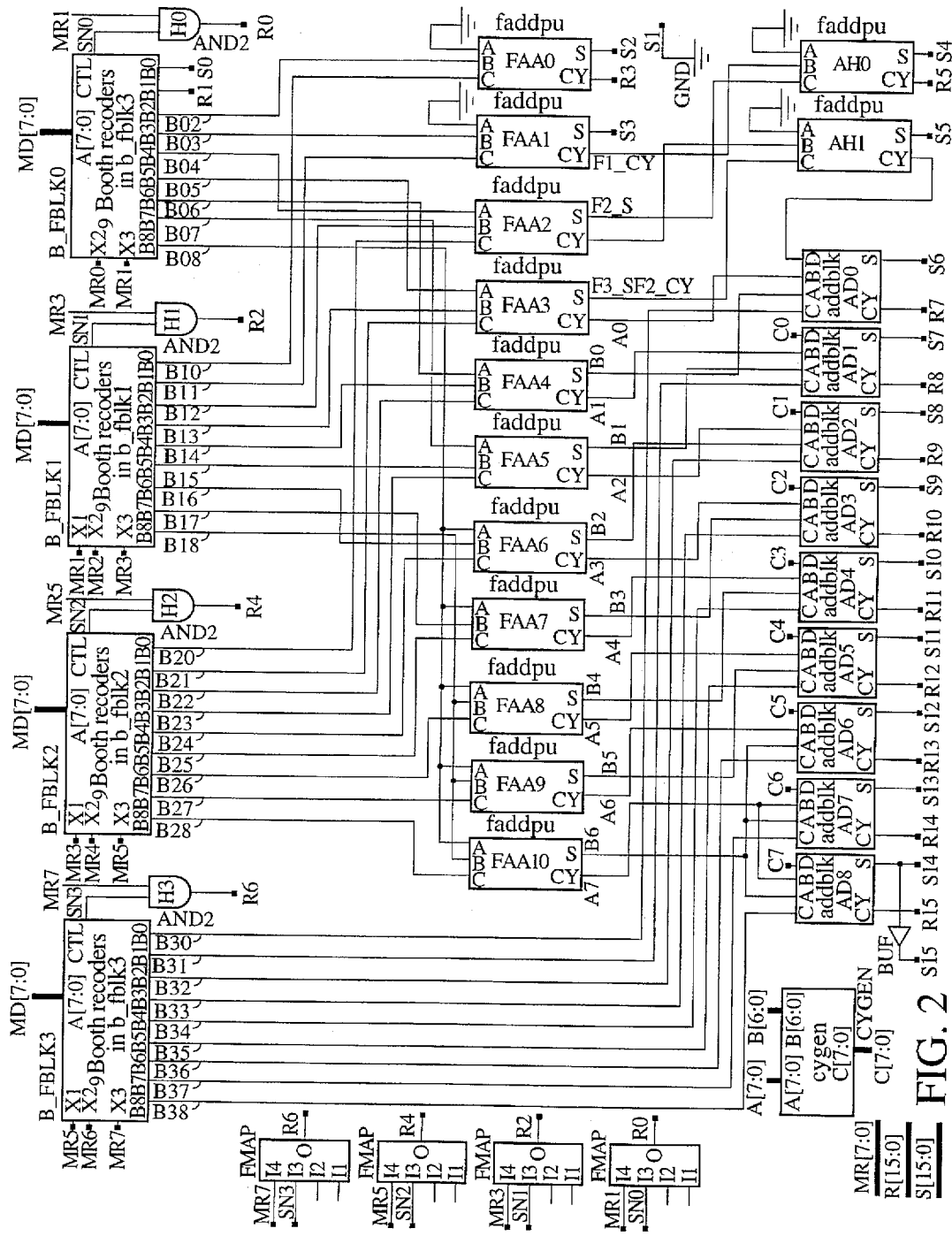
FIG. 2 illustrates a part of the multiplier circuit design of FIG. 1.

FIG. 2 illustrates the sum and carry generation block 110 which includes four, eight-bit recoder circuits: recoder 0 210, recoder 1 211, recoder 2 212 and recoder 3 213. The eight-bit recoder circuits generate partial products for use later in the block 110. Importantly, the eight-bit recoder circuits effectively reduce the bit length to be handled of signal MR 105 by recoding MR 105. By generating the recoded signal MR 105, the longest signal path through the multiplier circuit is reduced, thereby improving the speed of the multiplier and reducing the number of subsequent configurable logic elements needed. The longest signal path is the path through the multiplier which includes the most delays and therefore determines the speed of the design. The partial products are fed to a compression circuit 220 that compresses the partial products from three bits to two bits. In another embodiment, the compression circuit 220 compresses the partial products from five bits to three bits. The compression circuit 220 further reduces the longest signal path through the multiplier. The outputs of the compression circuit 220 are the two addends R 115 and S 117. The recoder circuits and the compression circuits are described in greater detail below.

Recoder Circuit

As noted above, recoder circuits produce partial products from the recoded signal MR 105. Each eight bit recoder circuit receives all eight bits of signal MD 107 and three bits from signal MR 105. An eight bit recoder circuit uses the three bits group to generate Booth control signals. The recoder 0 210 receives bits zero and one of signal MR 105 (a third bit is tied to ground). The recoder 1 211 receives bits one through three of signal MR 105. The recoder 2 212 receives bits three through five of signal MR 105. The recoder 3 213 receives bits five through seven of signal MR 105.

Some least significant bits of signals R115 and S117 are generated directly by the recoder circuits or are generated with little additional circuitry. For example, the recoder 210's least significant bit is the least significant bit of signal S117. The second least significant bit of the recoder 210 is bit R1 of signal R115. Further, each eight bit recoder is associated with an AND gate. The AND gates 218, 217, 216 and 215 generate some carries for signal R115 (particularly, the R6, R4, R2 and R0 bits). These AND gates ensure that the partial products are 2's complement numbers. BF3 273, for example, is a 1's complement number if signal MR7 is high. AND gate 218 ensures that a one is added, by the carry propagate adder 120, if signal MR7 is one. That is, AND gate 218 ensures that a one is effectively added to the partial product BF3 273 if the most significant bit of signal MR7 is high. In one embodiment, pairs of the AND gates are configured into configurable logic blocks of an XC4000 FPGA.

Figure 3:
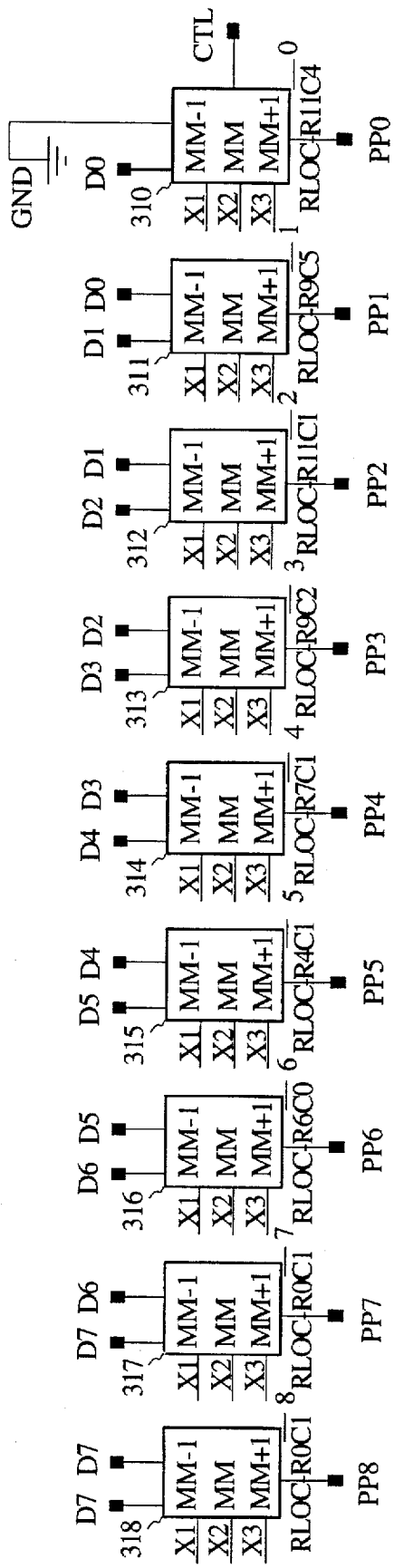
FIG. 3 illustrates an eight bit modified Booth recoder circuit of FIG. 2.

FIG. 3 illustrates an eight bit recoder circuit, as is used in FIG. 2. Note that there are nine single bit recoder circuits: bit recoder 310 through bit recoder 318. Each single bit recoder circuit receives two bits from signal MD 205 (shown as D0–D7) and produces a bit for the partial product (PP0–PP8). Each of the bit recoders also take three bits from the multiplier signal MR 105. These three bits are used as MRi+1, MRi and MRi–1 in the Booth recoding technique described above. Note that MR–1, MR, and MR+1 of FIG. 4 respectively correspond to MRi–1, MRi, and MRi+1 of Table 1. Similarly, MD and MD+1 correspond to MDi and MDi+1. To keep the sign bit of each partial product, the recoder 318 has both MD inputs tied to D7. Bit recoder 318 is used to account for the case where the Z control signal indicates a twice MD 205 action (2MD). Signal MD 205 is doubled by a one bit left shift. Thus, bit recoder 318 holds the most significant bit of 2MD.

Figure 4:
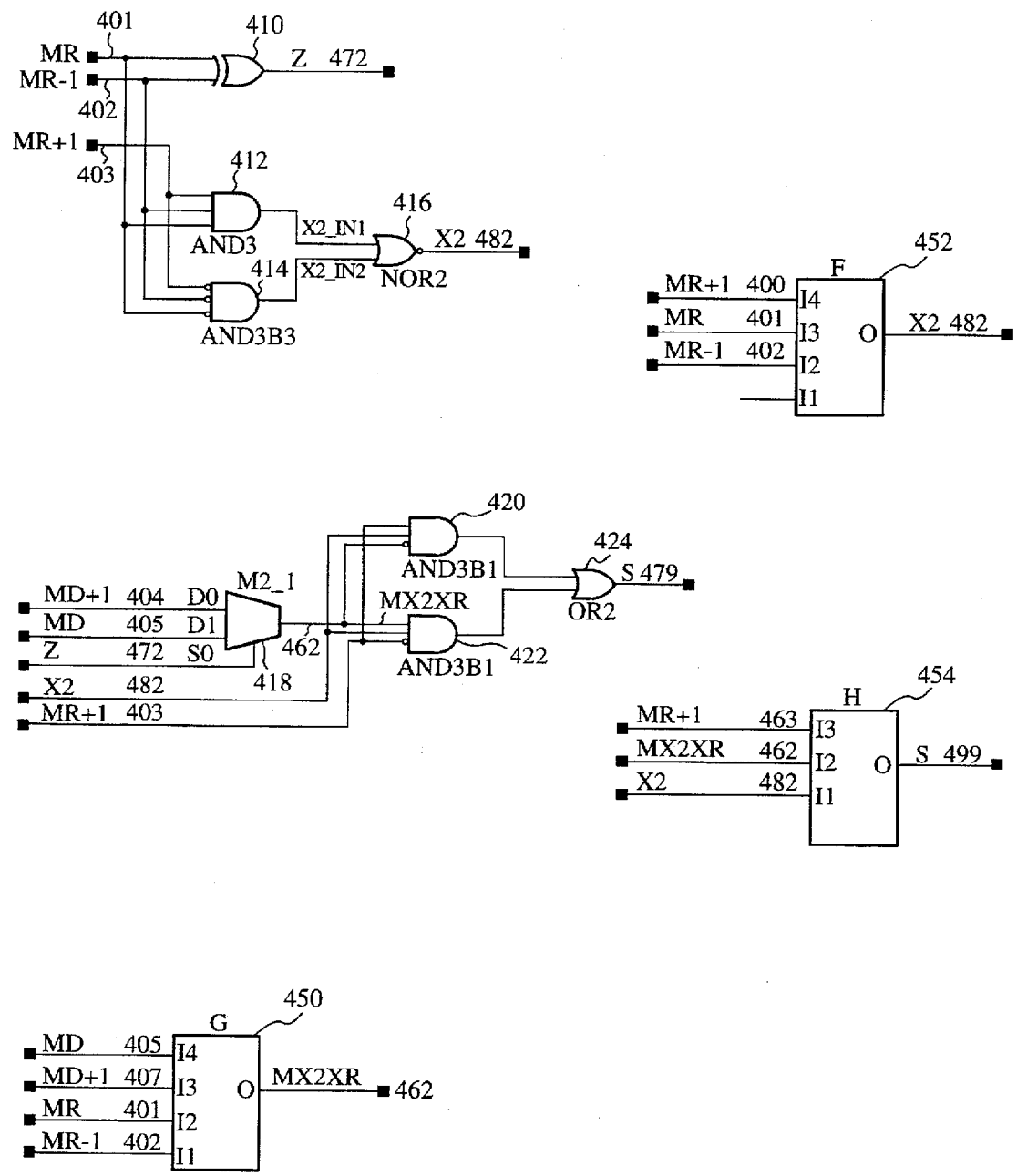
FIG. 4 illustrates a single bit recoder circuit of FIG. 3.

FIG. 4 illustrates the internal circuit of the one bit recoder circuit of FIG. 3. Importantly, this single bit recoder circuit produces the control signals for the recoding and uses these control signals to produce the partial product. Importantly, this single bit recoder circuit can be configured in a single programmable logic element of a programmable logic device. Thus, the single bit recoder circuit efficiently uses the programmable logic elements, providing improved speed of the multiplier and using fewer programmable logic elements than the shift and add multiplier designs previously used. The following text describes in detail one example of a single bit recoder circuit.

The signals MR 401 and MR–1 402 are exclusively OR'd (XOR 410) to generate the control signal Z 472. The multiplexer 418 selects between signals MD 405 and MD+1 404 using the control signal Z 472. As noted previously, the control signal Z determines whether the recoding action is to be one times MD or two times MD, represented by MX2XR 462. If Z 472 selects MD+1 404, then Z is selecting two times MD.

Signals MR 401, MR–1 402 and MR+1 403 are also used to generate X2 482 using the following logic expression: (MR AND MR–1 AND MR+1) NOR (~MR AND ~MR–1 AND ~MR+1). Signal X2 482 indicates whether no action is to be performed (the output signal of the single bit recoder circuit is zero).

As mentioned earlier, signal X1 is equivalent to MR+1 403, therefore, no additional circuitry is required to generate X1. Signal X1 indicates whether the action to be taken is positive or negative. A partial product, S 499, is generated from the logical expression: (MR+1 403 AND X2 482 AND ~MX2XR 462) OR (~MR+1 403 AND X2 482 AND MX2XR 462). In other embodiments, other equivalent logic expressions are used to generate similar signals to Z 472, MX2XR 462, X2 482 and S 499. In other embodiments, other logical expressions are used to generate partial product S 499.

In one embodiment, the bit recoder of FIG. 4 is implemented in a single configurable logic block of an XC4000 FPGA. Such a configurable logic block includes three function generators: two 4-1 function generators and a single 3-1 function generator. The 4-1 function generators provide two of the input signals to the 3-1 function generator. In another embodiment, the Xilinx XC5200™ FPGA is used to implement the multiplier circuit. In another embodiment, the Xilinx XC6200™ FPGA is used to implement the multiplier circuit.

In one embodiment, the XOR 410 and the multiplexer 418 are implemented in the 4-1 function generator G 450 of the configurable logic block. The logical expression used to generate signal X2 is included in a second 4-1 function generator F 452. Partial product S 499 is generated by a 3-1 function generator H 454. One embodiment has the advantage that the third input of the 3-1 function generator 454 is signal X1 (which equals MR+1 463 and therefore does not require additional circuitry). Thus, the complete partial product S 499 is generated entirely within a single configurable logic block.

Referring back to FIG. 2, in one embodiment where a configurable logic element has an additional output, some of the logic is reduced because the CTL inputs to the AND gates 218, 217, 216 and 215 are already generated from MR+1. Thus, the AND gates are moved into the programmable logic elements. Signals R0, R2, R4 and R6 are generated directly by one bit recoder circuit in each eight bit recoder circuit. For example, a bit recoder circuit need only generate MR+1 AND (MR OR MR–1) to generate the appropriate carry.

Compression Circuit

The compression circuit 220 performs a three to two compression of the partial products to generate a sum, S 117 and a carry R 115. In one embodiment, the compression circuit 220 implements a three to two Wallace tree. The compression circuit 220 includes eleven full adders 230, eleven add blocks 240 (including nine ADDBLK circuits and two more full adders), and a carry generation circuit CYGEN 250.

The full adders 230 receive the partial products from the recoder 0 210, recoder 1 211 and recoder 2 212. The full adders 230 compress the partial products BF0 270, BF1 271 and BF2 272 into two bit vectors. Each full adder 230 takes three bits from the partial products (one bit from each recoder block) and generates two bits representing a sum and a carry. The three bits have the same bit weight. The full adders generate a partial sum vector (B6–B0, F3_S, F2_S, S3 and S2) and a partial carry vector (A7–A0, F2_CY, F1_CY and R3). The A 252 and B 254 values are used by the CYGEN 250 circuit to generate the carry information (C 256) for the add blocks 240. The A 252, B 254 and C 256 are used as input to the add blocks 240. In one embodiment, each of the full adders and the add blocks are configured in a different configurable logic block of an XC4000 FPGA. S1 is tied to ground.

The CYGEN 250 circuit generates carry signal C 256 for the add blocks AD8-AD1. In one embodiment, each bit of signal C 256 is generated by ANDing two corresponding bits from A 252 and B 254. For example, A6 AND B6 generate C6. However, C7 is generated from A7 AND B6. In one embodiment, pairs of the AND gates in the CYGEN 250 are configured into separate function generators of a single configurable logic block of an XC4000 FPGA.

The add blocks 240 include two half adders: half adder 241 and half adder 242. In one embodiment, a half adder is created by tying one of the inputs to a full adder to ground. The least significant bits adder adds F1_CY and F2_S to generate S4 and R5. The other full adder adds F2_CY and F3_S to generate S5 and a carry. The carry is fed into the D input of the least significant add block.

The path through to the add blocks 240 and out to R7 represents the longest signal path through the MULTBLK 110 and therefore determines the speed of this portion of the multiplier circuit. Note that R0–R4, R6 and S0–S3 are all generated by the time the full adders 230 generate their output signals, thereby allowing the CPA16 120 to begin generating the least significant bits of the product P 125. By the time R7 is generated, CPA16 120 has been able to begin processing R0–R6 and S0–S6 and has completed processing at least some of these bits. Thus, the carry from the least significant bits of the CPA16 120 will have begun propagating towards the more significant bits, thereby reducing the maximum carry propagation delay of the CPA16 120. Reducing the maximum carry propagation delay of the CPA16 120 increases the speed of the multiplier design.

Figure 5:
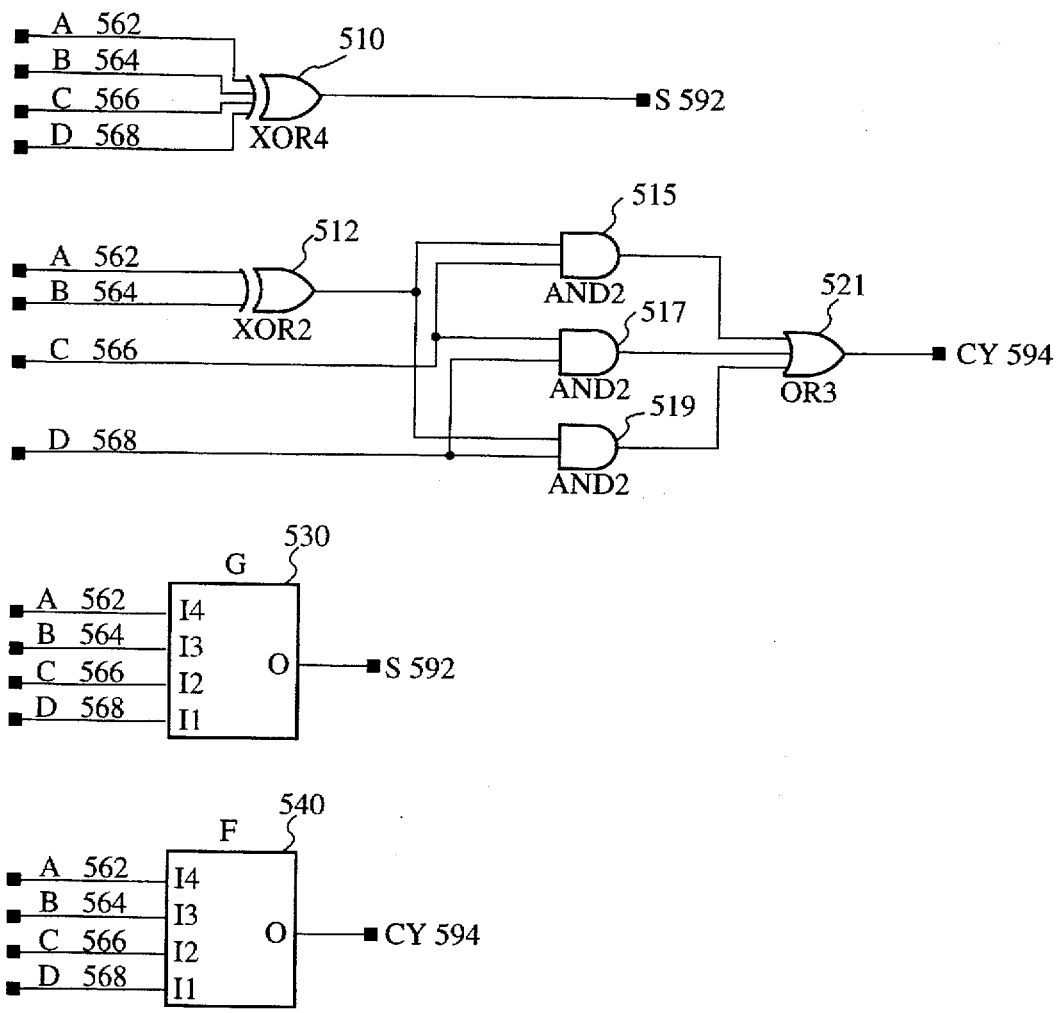
FIG. 5 illustrates an add block of FIG. 2.

Each of the add blocks ADDBLK0–ADDBLK7 has four inputs, three bits as part of a three to two compression and a carry. The three bits are taken from the partial sums generated by the full adders 230 and the recoder 3 213. As with the full adders, the three bits have the same bit weight. Each of the add blocks generates a sum S 592 and a carry CY 594. FIG. 5 illustrates a view of an add block of FIG. 2. The add blocks include a full adder and a portion of a half adder. The add block generates the sum by exclusively OR'ing the four input signals (XOR 510). The carry is generated using the logic expression: ((A 562 XOR B 564) AND (C 566 OR D 568)) OR (C 566 AND D 568). In one embodiment, using an XC4000 FPGA, S 592 is generated in a first function generator 530 while CY 594 is generated in a second function generator F 540. Thus, one add block can be configured in one configurable logic block.

As mentioned previously, one embodiment achieves a five to three compression of the partial products by using a five to three compression circuit. Five to three compression is also known as four to two compression. The five to three compression circuit adds all four partial products, from the recoder circuits, in one bank of compression circuits. Thus, the five to three compression circuit has three XOR delays as opposed to four delays in the circuit of FIG. 2 thereby improving the speed of the multiplier design.

The five to three compression circuit accepts four inputs having the same bit weight and add them to generate two outputs. The fifth input and third output of the five to three compression circuit are the carry_in and carry_out signals, respectively. The five to three compression circuit passes carry_in and carry_out in a carry chain. Having the carry_in and the carry_out facilitates the use of the dedicated carry logic and the four input function generators in one embodiment using the XC4000 devices (the carry logic is effectively the third output from one configurable logic block). Note, in one embodiment, the carry_in and carry_out cannot be switched to other connections without introducing considerable delay; therefore, using the carry_in and carry_out for the five to three compression circuits efficiently uses the architecture of the programmable logic device.

Multiplication Examples

The following illustrate the values of various signals in the multiplier design of FIG. 2 for different values of MD 107 and MR 105. The following are definitions of some signals in the examples below.

BF3 273—the output vector of recoder 213.
BF2 272—the output vector of recoder 212.
BF1 271—the output vector of recoder 211.
BF0 270—the output vector of recoder 210.
PSUM—The partial sum vector obtained after adding the partial products in the full adders 230. PSUM is the S output of the full adders 230.
PCY—the partial carry vector obtained after adding the partial products in the full adders 230. PCY is the CY output of the full adders 230.
C 256—the vector generated by the carry generation block 250.

| MD 107 | = 0000 0000 | = 0 × 10 |
|---|---|---|
| MR 105 | = 0000 0000 | = 0 × 10 |
| BF3 273 | = 0 0000 0000 | |
| BF2 272 | = 0 0000 0000 | |
| BF1 271 | = 0 0000 0000 | |
| BF0 270 | = 0 0000 0000 | |
| PSUM | = 000 0000 0000 | |
| PCY | = 000 0000 0000 | |
| C 256 | = 0000 0000 | |
| R 115 | = 0000 0000 0000 0000 | |
| S 117 | = 0000 0000 0000 0000 | |
| P 125 | = 0000 0000 0000 0000 | = 0 × 10 |
| --- | | |
| MD 107 | = 0101 0101 | = 85 × 10 |
| MR 105 | = 0101 0101 | = 85 × 10 |
| BF3 273 | = 0 0101 0101 | |
| BF2 272 | = 0 0101 0101 | |
| BF1 271 | = 0 0101 0101 | |
| BF0 270 | = 0 0101 0101 | |
| PSUM | = 001 0001 0100 | |
| PCY | = 000 0101 0101 | |
| C 256 | = 0000 0000 | |
| R 115 | = 0000 1000 1000 1000 | |
| S 117 | = 0001 0011 1011 0001 | |
| P 125 | = 0001 1100 0011 1001 | = 7225 × 10 |
| --- | | |
| MD 107 | = 1111 1000 | = −8 × 10 |
| MR 105 | = 0000 0100 | = 4 × 10 |
| BF3 273 | = 0 0000 0000 | |
| BF2 272 | = 0 0000 0000 | |
| BF1 271 | = 1 1111 1000 | |
| BF0 270 | = 0 0000 0000 | |
| PSUM | = 111 1111 1000 | |
| PCY | = 000 0000 0000 | |
| C 256 | = 0000 0000 | |
| R 115 | = 0000 0000 0000 0000 | |
| S 117 | = 1111 1111 1110 0000 | |
| P 125 | = 1111 1111 1110 0000 | = −32 × 10 |
| --- | | |
| MD 107 | = 0000 0100 | = 4 × 10 |
| MR 105 | = 1111 1110 | = −2 × 10 |
| BF3 273 | = 0 0000 0000 | |
| BF2 272 | = 0 0000 0000 | |
| BF1 271 | = 0 0000 0000 | |
| BF0 270 | = 1 1111 0111 | |
| PSUM | = 111 1111 1101 | |
| PCY | = 000 0000 0000 | |
| C 256 | = 0000 0000 | |
| R 115 | = 0000 0000 0000 0011 | |
| S 117 | = 1111 1111 1111 0101 | |
| P 125 | = 1111 1111 1111 1000 | = −8 × 10 |
| --- | | |
| MD 107 | = 1111 1001 | = −7 × 10 |
| MR 105 | = 1100 0000 | = −64 × 10 |
| BF3 273 | = 0 0000 0110 | |
| BF2 272 | = 0 0000 0000 | |
| BF1 271 | = 0 0000 0000 | |
| BF0 270 | = 0 0000 0000 | |
| PSUM | = 000 0000 0000 | |
| PCY | = 000 0000 0000 | |
| R 115 | = 0000 0000 0100 0000 | |
| S 117 | = 0000 0001 1000 0000 | |
| P 125 | = 0000 0001 1100 0000 | = 448 × 10 |

Thus, a fast multiplier design for a programmable logic device has been described. In one embodiment, the longest signal path through the multiplier design has been reduced through the use of an optimized recoding and compression circuit design. Additionally, the fast multiplier design has been optimized to take advantage of the programmable logic device's architecture thereby reducing the number of configurable logic elements needed to implement the design.

Further, one embodiment produces products faster than any Booth recoding and Wallace Tree multiplier design that may be described in Kumar et al. In one embodiment of the invention, the multiplier circuit of FIG. 1 multiplies two eight bit numbers in 66.9 ns (pin to pin time) on an XC4010PG191-5™ FPGA. The 66.9 ns time includes 8.6 ns for the signals to move on and off the FPGA. The Kumar 8×8 multiplier design calculated time is 71.5 ns while the actual measured time is 80.3 ns. Assuming these times are pin to pin calculations, the Kumar multiplier design is slower than the embodiment of FIG. 1. Further, it is not clear that the Kumar multiplier design times are pin to pin. If the Kumar multiplier design times are not pin to pin, then the embodiment of FIG. 1 is significantly faster than the Kumar multiplier design. This description of various embodiments of the invention has been presented for illustration. The description is not to limit the invention to the precise embodiments disclosed. Instead, the following claims define the scope of the invention.

I claim:

1. A multiplier circuit in a programmable logic device, the multiplier circuit has as input signals an M bit multiplicand and an N bit multiplier, the multiplier circuit has an N plus M bit output signal representing the product of the multiplier and the multiplicand, the multiplier circuit comprises:

a Booth recoder circuit coupled to receive the multiplicand and the multiplier, the Booth recoder circuit outputs a set of partial products, a first part of a sum, and a first part of a carry, wherein the first part of a carry includes a plurality of correction bits if a partial product is negative;

a Wallace tree compression circuit coupled to the Booth recoder circuit and receiving the partial products, the Wallace tree compression circuit outputs a second part of the sum and a second part of the carry; and an adder circuit coupled to the Booth recoder circuit and receiving the first part of the sum and the first part of the carry, including the plurality of correction bits if the partial product is negative, the adder circuit further coupled to the Wallace tree compression circuit and receiving the second part of the sum and the second part of the carry, the adder circuit outputs the product of the multiplier and the multiplicand, wherein at least one bit of at least one partial product of the set of partial products is generated entirely within one configurable logic element of the programmable logic device.

2. The multiplier circuit of claim 1 wherein N is eight and M is eight and wherein the Booth recoder circuit comprises four groups of nine single bit partial product generation circuits and wherein each single bit partial product generation circuit is implemented entirely within one configurable logic element of the programmable logic device.

3. The multiplier circuit of claim 1 wherein the Wallace tree is a three to two Wallace tree.

4. The multiplier circuit of claim 1 wherein the Wallace tree is a five to three Wallace tree.

5. The multiplier circuit of claim 1 wherein the adder is a carry propagate adder.

6. A multiplier circuit in a programmable logic device, said programmable logic device including a plurality of programmable logic elements, said multiplier circuit having as inputs an M bit multiplicand and an N bit multiplier, said multiplier circuit for generating a product, said multiplier circuit comprising:

a plurality of partial product generator circuits, each of said plurality of partial product generator circuits having as input said multiplicand and a plurality of least significant bits of said multiplier, each of said plurality of partial product generator circuits having as output a partial product;

a plurality of compression circuits, said compression circuits having as output a first addend and a second addend, each of said plurality of compression circuits coupled to, and receiving outputs from at least two of said partial product generator circuits, each of said plurality of compression circuits having as output a bit of said first addend and a bit of said second addend;

an adder circuit coupled to said plurality of compression circuits and having as input said first addend and said second addend and having as output said product; and wherein at least one of said plurality of said partial product generator circuits includes a Booth recoder circuit coupled to a partial product output circuit, said Booth recoder circuit coupled to said partial product output circuit for providing control signals to indicate a multiple of said multiplicand and a sign of said multiplicand, said Booth recoder circuit and said partial product output circuit being configured within a single programmable logic element.

7. The multiplier circuit of claim 6 wherein said compression circuit includes a five to three Wallace Tree comprising a first set of adders coupled to and receiving the outputs of a first partial product generator circuit, a second partial product generator circuit, a third partial product generator circuit, and a fourth partial product generator circuit, said first set of adders for generating said part of said first addend and said part of said second addend.

8. The multiplier circuit of claim 6 wherein M is eight and N is eight.

9. The multiplier circuit of claim 6 wherein M is sixteen and N is sixteen.

10. The multiplier circuit of claim 6 wherein said at least one of said plurality of partial product generator circuits includes an M bit Booth recoding circuit for generating a first partial product in response to receiving all bits of said multiplicand and three bits from said multiplier.

11. The multiplier circuit of claim 10 wherein said M bit Booth recoding circuit includes M+1 single bit recoding circuits and wherein said first partial product includes M+1 bits.

12. The multiplier circuit of claim 6 wherein said compression circuit includes a three to two Wallace Tree comprising:

a first set of adders coupled to and receiving the outputs of a first partial product generator circuit, a second partial product generator circuit, and a third partial product generator circuit, said first set of adders providing a first value and a second value; and a second set of adders coupled to and receiving said first value, a part of said second value, and the outputs of a fourth partial product generator circuit and providing a part of said first addend and a part of said second addend.

13. The multiplier circuit of claim 12 wherein said compression circuit further includes a carry generation circuit, said carry generation circuit for generating a carry set from said first value and said second value, said carry set being as inputs to said second set of adders.

14. The multiplier circuit of claim 12 wherein said first addend is a sum of said second set of adders and said second addend is a carry of said second set of adders, and wherein bit two of said second addend is generated by performing an AND of a bit three of said multiplier and a control signal generated from bits one through three of said multiplier, said control signal is a zero when said bit one, said bit two and said bit three are all one and when said bit one, said bit two and said bit three are all zero, wherein otherwise said control signal is one.

15. A multiplier circuit in a programmable logic device, said programmable logic device including a plurality of programmable logic elements, said multiplier circuit having as inputs an M bit multiplicand and an N bit multiplier, said multiplier circuit for generating a product, said multiplier circuit comprising:
- a plurality of partial product generator circuits, each of said plurality of partial product generator circuits having as input said multiplicand and a plurality of least significant bits of said multiplier, each of said plurality of partial product generator circuits having as output a partial product;
- a plurality of compression circuits, said compression circuits having as output a first addend and a second addend, each of said plurality of compression circuits coupled to, and receiving outputs from, at least two of said partial product generator circuits, each of said plurality of compression circuits having as output a bit of said first addend and a bit of said second addend:
- an adder circuit coupled to said plurality of compression circuits and having as input said first addend and said second addend and having as output said product; and
- wherein at least one of said plurality of said partial product generator circuits includes a Booth recoder circuit coupled to a partial product output circuit, said Booth recoder circuit coupled to said partial product output circuit for providing control signals to indicate a multiple of said multiplicand and a sign of said multiplicand, said Booth recoder circuit and said partial product output circuit being configured within a single programmable logic element, wherein said Booth recoder circuit is coupled to and receiving a bit MRi−1, a bit MRi of said multiplier and wherein a first control signal of said control signals is generated by an exclusive OR of said bit MRi−1 and said bit MRi.

16. The multiplier circuit of claim 15 wherein said Booth recoder circuit is further coupled to and receiving a bit MRi+1 of said multiplier and wherein a second control signal of said control signals is output as a zero when said bit MRi−1, said bit MRi and said bit MRi+1 are all one and when said bit MRi−1, said bit MRi and said bit MRi+1 are all zero, wherein otherwise said second control signal is one.

17. The multiplier circuit of claim 16 wherein said single programmable logic element includes a first function generator, a second function generator and a third function generator and where said first function generator generates said first control signal, said second function generator generates and uses said second control signal and outputs a value, and where said third function generator receives as inputs said first control signal, said value, and a third control signal, and outputs a first bit of said first partial product.

18. The multiplier circuit of claim 16 wherein a third control signal of said control signals is equal to said bit MRi+1.

19. A method of generating a bit of a first addend and a bit of a second addend, said first addend plus said second addend being a product of an N bit multiplicand and an M bit multiplier in a programmable logic device, said programmable logic device including a plurality of programmable logic elements, said method comprising the steps of:
- generating a first set of three partial product bits from said multiplicand and a first plurality of least significant bits of said multiplier, a second set of three partial product bits from said multiplicand and a second plurality of next least significant bits of said multiplier, and a third set of three partial product bits from said multiplicand and a third plurality of most significant bits of said multiplier from a Booth recoder circuit, each of said sets of three partial product bits representing three equally weighted bits of three partial products, each bit of each partial product being generated in a different partial product generator circuit and in a different programmable logic element;
- adding said first set of three partial product bits to form a first value bit;
- adding said second set of three partial product bits to form a second value bit and a third value bit;
- adding said third set of three partial product bits to form a fourth value bit;
- adding said first value bit and said second value bit to form a fifth value bit which is the carry output of such addition;
- generating a fourth partial product bit from said multiplicand and a fourth portion of said multiplier;
- adding said fifth value bit, said third value bit, said fourth value bit and said fourth partial product bit, to generate a carry bit, said carry bit being said bit of said first addend.

20. The method of claim 19 wherein said fourth partial product bit is generated with said Booth recoder circuit from bit five through bit seven of said multiplier and bit zero and bit one of said multiplicand.

21. The method of claim 19 wherein said first value bit is a carry from a first full adder implemented in a first programmable logic element, said second value bit is a sum from a second full adder implemented in a second programmable logic element, said third value bit is a carry from said second full adder implemented in said second programmable logic element, said fourth value bit is a sum from a third full adder implemented in a third programmable logic element, said fifth value bit is a carry from a half adder implemented in a fourth programmable logic element, and said bit of said first addend is a carry from a fourth full adder implemented in a fifth programmable logic element.

22. The method of claim 19 wherein said step of generating said first, said second, and said third sets of three partial product bits includes generating said first set of three partial product bits from:
- bit zero and bit one of said multiplier and bit four and bit five of said multiplicand;
- bits three through bit one of said multiplier and bit two and bit three of said multiplicand; and
- bits five through bit three of said multiplier and bit zero and bit one of said multiplicand.

23. An eight bit by eight bit multiplier circuit design for a programmable logic device, said multiplier including:
- a first Booth recoding circuit for generating three partial products from a multiplier and a multiplicand, a first part of a sum, and a first part of a carry;
- a first Wallace Tree circuit coupled to the first Booth recoding circuit and receiving the three partial products for generating a second part of the sum and a second part of the carry from the three partial products; and
- a carry propagate adder coupled to said Booth recoding circuit and receiving said first part of the sum and said first part of the carry, said carry propagate adder further coupled to said Wallace tree compression circuit and receiving the second part of the sum and the carry for generating a product from the first and second parts of the sum and the first and second parts of the carry,
- wherein the longest signal path through the multiplier circuit design includes a circuit that generates bit seven of the carry and excludes circuits that generate lower bits of the carry.

24. The multiplier of claim 23 wherein the Wallace Tree includes a set of four to two compression circuits.

25. The multiplier of claim 23 wherein the Wallace Tree includes a set of five to three compression circuits.

26. The multiplier of claim 23 wherein the first Booth recoding circuit includes nine single bit Booth recoding circuits and the nine single bit Booth recoding circuits are able to represent plus and minus of: zero times a multiplicand, one times the multiplicand and two times a multiplicand.

27. A multiplier circuit in a programmable logic device, said programmable logic device including a plurality of programmable logic elements, said multiplier circuit having as inputs an M bit multiplicand and an N bit multiplier, said multiplier circuit for generating a product, said multiplier circuit comprising:

a plurality of partial product generator circuits, each of said plurality of partial product generator circuits having as input said multiplicand and a portion of said multiplier, each of said plurality of partial product generator circuits having as output a partial product;

a plurality of compression circuits, said compression circuits having as output a first addend and a second addend, each of said plurality of compression circuits coupled to, and receiving an input from, at least two of said partial product generator circuits, each of said plurality of compression circuits having as output a part of said first addend and a part of said second added, wherein said second addend includes a plurality of correction bits if a partial product is negative;

at least one of said plurality of compression circuits including a three to two Wallace Tree, said Wallace Tree comprising a first set of adders coupled to and receiving the outputs of a first partial product generator circuit, a second partial product generator circuit, and a third partial product generator circuit, said first set of adders providing a first value and a second value, said Wallace Tree further comprising a second set of adders coupled to and receiving said first value and the outputs of a fourth partial product generator circuit and providing said part of said first addend and said part of said second addend; and an adder circuit coupled to said plurality of compression circuits and having as input said first addend and said second addend and having as output said product, wherein at least one of said plurality of partial product generator circuits includes a Booth recoder circuit coupled to a partial product output circuit, said Booth recoder circuit coupled to said partial product output circuit for providing control signals to indicate a multiple of said multiplicand and a sign of said multiplicand, said Booth recoder circuit and said partial product output circuit being configured within a single programmable logic element.

28. The multiplier circuit of claim 27 wherein said at least one compression circuit further includes a carry generation circuit, said carry generation circuit for generating a carry set from said first value and said second value, said carry set being as input to said second set of adders.

29. A multiplier circuit in a programmable logic device, said programmable logic device including a plurality of programmable logic elements, said multiplier circuit having as inputs an M bit multiplicand and an N bit multiplier, said multiplier circuit for generating a product, said multiplier circuit comprising:

a plurality of partial product generator circuits, each of said plurality of partial product generator circuits having as input said multiplicand and a portion of said multiplier, each of said plurality of partial product generator circuits having as output a partial product;

a plurality of compression circuits, said compression circuits having as output a first addend and a second addend, each of said plurality of compression circuits coupled to, and receiving an input from, at least two of said partial product generator circuits, each of said plurality of compression circuits having as output a part of said first addend and a part of said second added, wherein said second addend includes a plurality of correction bits if a partial product is negative;

at least one of said plurality of compression circuits including a five to three Wallace Tree comprising a first set of adders coupled to and receiving the outputs of a first partial product generator circuit, a second partial product generator circuit, a third partial product generator circuit, and a fourth partial product generator circuit, said first set of adders for generating said part of said first addend and said part of said second addend; and an adder circuit coupled to said plurality of compression circuits and having as input said first addend and said second addend and having as output said product, wherein at least one of said plurality of partial product generator circuits includes a Booth recoder circuit coupled to a partial product output circuit, said Booth recoder circuit coupled to said partial product output circuit for providing control signals to indicate a multiple of said multiplicand and a sign of said multiplicand, said Booth recoder circuit and said partial product output circuit being configured within a single programmable logic element.

30. A multiplier circuit in a programmable logic device, said programmable logic device including a plurality of programmable logic elements, said multiplier circuit having as inputs an M bit multiplicand and an N bit multiplier, said multiplier circuit for generating a product, said multiplier circuit comprising:

a plurality of partial product generator circuits, each of said plurality of partial product generator circuits having as input said multiplicand and a portion of said multiplier, each of said plurality of partial product generator circuits having as output a partial product;

a plurality of compression circuits, said compression circuits having as output a first addend and a second addend, each of said plurality of compression circuits coupled to, and receiving an input from, at least two of said partial product generator circuits, each of said plurality of compression circuits having as output a part of said first addend and a part of said second added; and an adder circuit coupled to said plurality of compression circuits and having as input said first addend and said second addend and having as output said product, wherein at least one of said plurality of partial product generator circuits includes a Booth recoder circuit coupled to a partial product output circuit, said Booth recoder circuit coupled to said partial product output circuit for providing control signals to indicate a multiple of said multiplicand and a sign of said multiplicand, wherein said first addend is a sum and said second addend is a carry and wherein bit two of said carry is generated by performing an AND of a bit three of said multiplier and a control signal generated from bits one through three of said multiplier, said control signal is a zero when said bit one, said bit two and said bit three are all one and when said bit one, said bit two and said bit three are all zero, and wherein otherwise said control signal is one, said Booth recoder circuit and said partial product output circuit being configured within a single programmable logic element.

* * * * *